United States Patent
Skupien

[11] Patent Number: 5,857,515
[45] Date of Patent: Jan. 12, 1999

[54] HEAT EXCHANGING DEVICE

[75] Inventor: David M. Skupien, 113 Tower Ct., Fox River Grove, Ill. 60021

[73] Assignee: David M. Skupien, Fox River Grove, Ill.

[21] Appl. No.: 420,476

[22] Filed: Apr. 12, 1995

[51] Int. Cl.[6] .................................. F28F 1/16; F28F 1/20; F28F 1/22; F28F 21/06
[52] U.S. Cl. ........................ 165/47; 165/164; 165/180; 165/183; 165/78; 165/905
[58] Field of Search .................. 165/47, 180, 183, 165/164, 77, 78, 905

[56] References Cited

U.S. PATENT DOCUMENTS

| | | | |
|---|---|---|---|
| 1,942,211 | 1/1934 | Hartwig | 165/164 |
| 2,305,992 | 12/1942 | Quillen | 165/164 |
| 2,405,722 | 8/1946 | Villier | 165/183 |
| 2,687,626 | 8/1954 | Bartlowe | 165/164 |
| 3,301,319 | 1/1967 | Merrill | 165/77 |
| 3,735,465 | 5/1973 | Tibbetts et al. | 165/183 |
| 3,756,313 | 9/1973 | Beach | 165/183 |
| 3,782,452 | 1/1974 | Ceplon | 165/164 |
| 4,147,037 | 4/1979 | Gelbard et al. | 165/164 |
| 4,377,155 | 3/1983 | Tonomura et al. | 165/183 |
| 4,456,058 | 6/1984 | Powell | 165/154 |
| 4,683,941 | 8/1987 | Timmer et al. | 165/49 |
| 5,174,371 | 12/1992 | Grillo | 165/183 |
| 5,337,807 | 8/1994 | Ryan | 165/146 |

FOREIGN PATENT DOCUMENTS

| | | | |
|---|---|---|---|
| 0569342 | 1/1959 | Canada | 165/164 |
| 0021597 | 1/1981 | European Pat. Off. | 165/164 |
| 1061805 | 7/1959 | Germany | 165/164 |
| 1600601 | 4/1970 | Germany | 165/164 |
| 2713069 | 10/1978 | Germany | 165/78 |
| 3320474 | 12/1984 | Germany | 165/164 |
| 3521585 | 12/1986 | Germany | 165/47 |
| 0138993 | 8/1983 | Japan | 165/164 |
| 0049447 | 3/1984 | Japan | 165/164 |
| 191136 | 11/1937 | Switzerland | 165/164 |
| 345794 | 4/1931 | United Kingdom | 165/164 |
| 0829103 | 2/1960 | United Kingdom | 165/164 |
| 2146422 | 4/1985 | United Kingdom | 165/78 |
| 2165932 | 4/1986 | United Kingdom | 165/47 |

OTHER PUBLICATIONS

"Electric Water Heater Manual", Raritan Engineering Company, Inc., Millville, NJ USA, 1990.
"Heat Recovery Systems Pamphlet", Egosaver Co., Mississauga, Ontario, Canada, No date provided.
"Model H–60 Owner's Manual", Crispaire Corporation, Atlanta, Georgia, USA, Jun. 1990.
"Model R106K2 Heat Pump Water Heater Pamphlet", Crispaire Corporation, Atlanta, Georgia, USA, 1994.
"Model WH–6B E–Tech Heat Pump Water Heater Pamphlet", Crispaire Corporation, Atlanta, Georgia, USA, 1994.
"Model B108K2 Heat Pump Water Heater Pamphlet", Crispaire Corporation, Atlanta, Georgia, USA, 1994.

*Primary Examiner*—John K. Ford

[57] ABSTRACT

A heat exchanging device absorbs heat from a heat source, in the form of waste fluid, and exchanges the absorbed heat to an object which benefits from warming. The heat exchanging device is coupled to a first structure, the combination of the heat exchanging device and the first structure forming a passage for the waste fluid to flow. Within the passage, absorption fins absorb heat from the waste fluid. The device is also engaged with a second structure which contains the object which benefits from warming. The heat absorb by the fins and the remaining body of the heat exchanging device is exchanged to the second structure, which in turn exchanges the heat to the object contained within the second structure. The heat exchanging device exchanges the heat from the waste fluid to the object in a simple and cost effective manner.

5 Claims, 4 Drawing Sheets

HEAT EXCHANGING DEVICE

FIELD OF THE INVENTION

The invention is generally related to heat exchanging devices, and more particularly to passive heat exchanging devices for implementation in residential, commercial industrial structures.

BACKGROUND OF THE INVENTION

Heat exchanging devices are well known. In general, heat exchanging devices can be categorized into active heat exchanging devices and passive heat exchanging devices. Active heat exchanging devices include heat pumps, which have as a characteristic the requirement for electricity to "pump" heat from one location to another. Examples of active heat exchanging devices are freezers, refrigerators, ice makers, etc.

A characteristic of a passive heat exchanging device is that no external input (e.g., electricity) is required to operate the device. The passive heat exchanging device is configured so that the device is able to absorb heat from a particular heat source, and "exchange" the absorbed heat to a separate object which itself requires warming. By utilizing the "free" heat of the heat source to warm the object, the amount of overall energy to heat the object to a desired temperature is reduced. This in turn leads to a significant cost savings over time.

In the majority of passive heat exchanging device implementations, the source of heat to be absorbed is from heat which is wasted from some other component within the implementation. For example, much of the heat which is "pumped" from refrigerators, freezers, ice makers, etc., mentioned above is utilized to warm a separate object. Many of these passive heat exchanging devices which utilize this wasted heat are quite complicated in their operation.

Heat is also wasted in implementations where waste fluid of a particular implementation is heated. As an example, the waste fluid (water) from a shower installation may act as a heat source for heat exchanging purposes. In a typical shower installation, the waste water which exits the shower is, on the average, approximately 2.5 degrees Celsius (°C.) cooler than the water being output by the shower and used by the shower user. In other words, if a shower outputs water at 39.5° C., the water exiting the shower through a drain is, on the average, 37.0° C. Consequently, the amount of heat that could be generated by a shower drain (for example) may be quite considerable. However, no simple and cost effective means to absorb and exchange this heat is available.

Thus, a need exists for a passive heat exchanging device which absorbs heat from a waste fluid and exchanges the heat to a particular object in a simple and cost effective manner.

SUMMARY OF THE INVENTION

It is therefore an object of the present invention to provide an improved heat exchanging device.

A related object of the present invention is to provide an improved heat exchanging device which utilizes waste fluid as a heat source.

Another object of the present invention is to provide an improved heat exchanging device which is simple in its operation.

Yet another object of the present invention is to provide an improved heat exchanging device which is cost effective both in its manufacture and installation.

These and other objects will become apparent upon reading the following detailed description of the preferred embodiment of the present invention, while referring to the attached drawings.

DETAILED DESCRIPTION OF THE PREFERRED EMBODIMENT

Generally, a heat exchanging device absorbs heat from a heat source, in the form of waste fluid, and exchanges the absorbed heat to an object which benefits from warming. The heat exchanging device is coupled to a first structure, the combination of the heat exchanging device and the first structure forming a passage for the waste fluid to flow. Within the passage, absorption fins absorb heat from the waste fluid. The device is also engaged with a second structure which contains the object which benefits from warming. The heat absorbed by the fins and the remaining body of the heat exchanging device is exchanged to the second structure, which in turn exchanges the heat to the object contained within the second structure. The heat exchanging device exchanges the heat from the waste fluid to the object in a simple and cost effective manner.

More specifically, the heat exchanging device comprises first and second portions for coupling the heat exchanging device to a first structure, where the combination of the heat exchanging device and the first structure form a passage for the heat source to flow. The heat exchanging device also comprises a third portion for engaging the heat exchanging device with a second structure.

In the preferred embodiment, the heat exchanging device further comprises a plurality of absorption fins, integral with the third portion, for absorbing heat from the heat source so as to heat the heat exchanging device. Also in the preferred embodiment, the plurality of absorption fins run the predetermined length of the heat exchanging device. The object contained within the second structure is cold water in the preferred embodiment.

Figure 1:
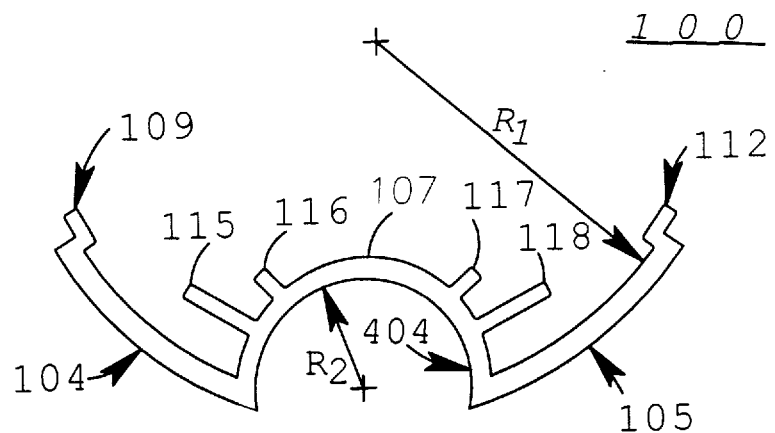
FIG. 1 generally depicts a front elevational view of the heat exchanging device in accordance with the invention.

A heat exchanging device 100 in accordance with the invention is depicted in FIG. 1. In the preferred embodiment, the heat exchanging device 100 is passive, and as such requires no external input for implementation. Also in the preferred embodiment, the heat exchanging device 100 is constructed of aluminum, but other heat conductive materials may be implemented as one of ordinary skill in the art will appreciate. The heat exchanging device 100 is primarily intended for implementation in residential, commercial and industrial structures, but may be beneficially implemented in any structure where suitable.

A front elevational view of the heat exchanging device 100 is depicted in FIG. 1. The heat exchanging device 100 extends for a predetermined length $L_1$, which is not depicted in FIG. 1. The heat exchanging device 100 is characterized by three semi-circular portions which are integral with one another. The first semi-circular portion 104 and the second semi-circular portion 105 of the heat exchanging device 100 have a curvature defined by a first radius $R_1$. In the preferred embodiment, the radius $R_1$ is approximately 3.81 centimeters (cm). Coupling portions 109, 112 are notched so that the heat exchanging device 100 may be coupled to a first structure (not shown in FIG. 1) along the predetermined length $L_1$ of the heat exchanging device 100.

The third semi-circular portion 107 of the heat exchanging device 100 has a second curvature which is defined by a second radius $R_2$. In the preferred embodiment, the radius $R_2$ is approximately 1.11 cm. The heat exchanging device 100 defined by a radius $R_2$ has a surface 103 which extends around the curvature defined by radius $R_2$. The heat exchanging device 100 is configured to engage with a second structure (not shown in FIG. 1).

The heat exchanging device 100 depicted in FIG. 1 also comprises a plurality of absorption fins 115–118. The absorption fins 115–118 are utilized to absorb heat from a heat source, and they extend outward from the third semi-circular portion 107. In the preferred embodiment, the heat source is heated waste fluid (for example, heated waste water from a shower drain). The extension length, placement and number of absorption fins 115–118 of the heat exchanging device 100 may vary with design requirements as one of ordinary skill in the art will appreciate. In the preferred embodiment, the absorption fins 115–118 are integral with the third semi-circular portion 107, but other methods of attachment are contemplated.

Figure 2:
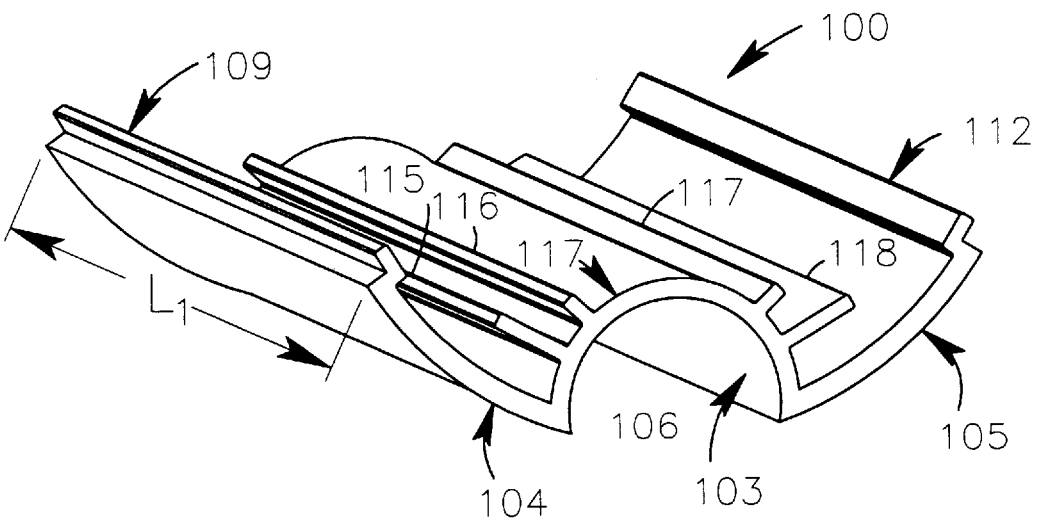
FIG. 2 generally depicts a front, top and left side perspective view of the heat exchanging device in accordance with the invention.

A front, top and left side perspective view of the heat exchanging device 100 in accordance with the invention is depicted in FIG. 2. As depicted in FIG. 2, the heat exchanging device 100 has a predetermined length $L_1$. In the preferred embodiment, the predetermined length $L_1$ is approximately 3.0 meters (m). However, a range of lengths from 0.6 m to 6.0 m are contemplated. For particular applications, a predetermined length $L_1$ greater than 6.0 m may be desired. Also in the preferred embodiment, the coupling portions 109, 112 and the absorption fins 115–118 run the entire length of the heat exchanging device 100.

Figure 3:
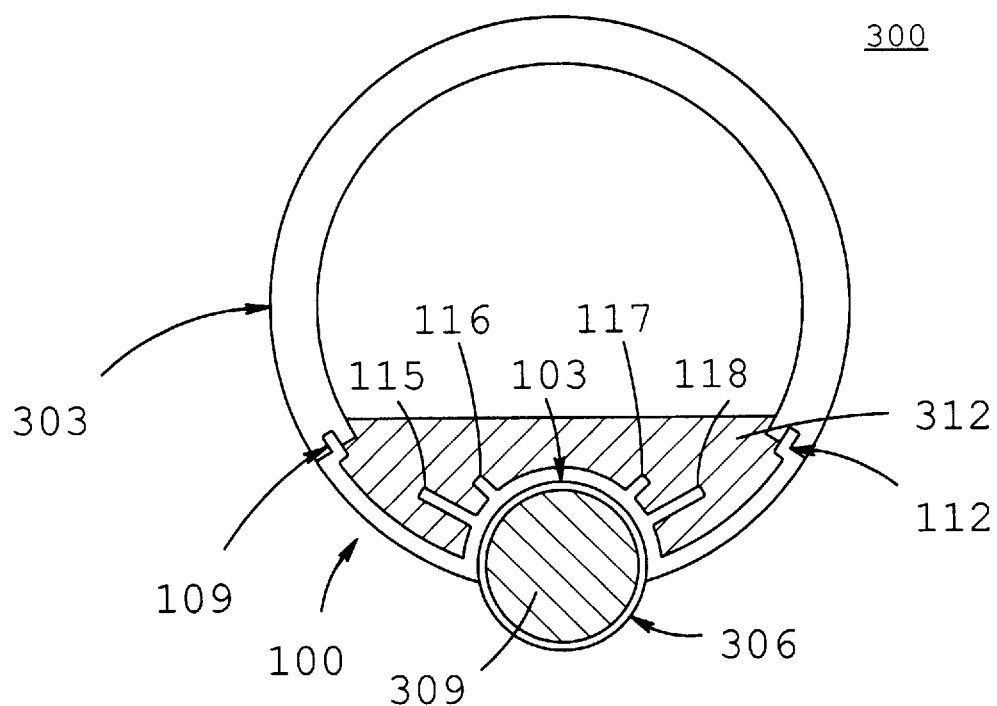
FIG. 3 generally depicts a front view of a heat exchanging tubing configuration implementing the heat exchanging device of FIG. 1 and FIG. 2 in accordance with the invention.

A front view of a heat exchanging tubing configuration 300 implementing the heat exchanging device 100 in accordance with the invention is depicted in FIG. 3. As depicted in FIG. 3, the heat exchanging device 100 is coupled to a first structure 303 via the coupling portions 109, 112. The combination of the heat exchanging device 100 and the first structure 303 comprise the heat exchanging tubing configuration 300, and also form a passage for a heat source to flow. In the preferred embodiment, the heat source is a waste fluid 312 which is heated.

In the preferred embodiment, the first structure 303 is poly vinyl chloride (PVC) tubing. As depicted in FIG. 3, the PVC tubing 303 has a portion cut therefrom to accept the heat exchanging device 100. To provide for tight coupling between the PVC tubing 303 and the heat exchanging device 100, the PVC tubing 303 is notched at the edges of the cut portion to accept the coupling portions 109, 112 of the heat exchanging device 100. As stated above, the coupling portions 109, 112 run the entire predetermined length $L_1$ of the heat exchanging device 100. In the preferred embodiment, the PVC tubing 303 and the heat exchanging device 100 are bonded together using an silicon-based adhesive, although other methods are contemplated.

Also depicted in FIG. 3 is the heat exchanging device 100 engaged with a second structure 306. The dimensions of the open area 106 (defined by the radius $R_2$ and the surface 103 of FIG. 1) are such that the second structure 306 is engaged with the heat exchanging device 100 at the open area 106 by the surface 103 extending around the curvature defined by the second radius $R_2$. The heat exchanging device 100 is sufficiently flexible such that the second structure 306 may be snapped into the open area 106. In alternate designs, the second structure 306 may be thermally bonded to the heat exchanging device 100. The coupling of the heat exchanging device 100 to the first structure 303 allows heat which is absorbed by the absorption fins 115–118 and the remaining body of the heat exchanging device 100 to be exchanged to the second structure 306. Transferring heat to the second structure 306 in turn allows a particular object contained within the second structure 306 to be warmed. In the preferred embodiment, the object contained within the second structure 306 is a cold supply fluid 309, such as a cold water supply.

In the preferred embodiment, the second structure is comprised of Copper (Cu) tubing. The second structure 306, which has an outer radius approximately equal to the radius $R_2$, is a size which is a typical (standard) size for implementation in residential, commercial and industrial structures. As one of ordinary skill in the art will appreciate, the open area 106 defined by the radius $R_2$ and the surface 103 may increase or decrease in size depending on the outer radius of a chosen second structure 306. In that scenario, the radius $R_2$ will likewise increase or decrease accordingly.

As is apparent from FIG. 3, the surface 103 is in substantial thermal contact with the outer portion of the second structure 306 such that any heat absorbed by the heat exchanging device 100 is exchanged to the second structure 306, and thus exchanged to the cold supply fluid 309. To maximize the thermal transfer from the heat exchanging device 100 to the second structure 306, thermal grease (not shown) may be disposed between the surface 103 of the heat exchanging device 100 and the second structure 306. As previously stated, one typical implementation of the heat exchanging device 100 is a shower installation. In that implementation, the waste fluid 312 is heated waste water flowing down a shower drain. The cold supply fluid 309 is a cold water supply which is eventually mixed with the warm water supply to provide water for the shower user. After the heat exchange as described above is completed, the cold water supply 309 is warmer than it would be without use of the heat exchanging device 100. In applications where cold water is mixed with hot water (as in the shower example) the amount of hot water required to heat the mixed water to a temperature required by a user is reduced. Since less hot water is used, less energy is expended to heat the hot water. This in turn leads to a significant cost savings over time.

Figure 6:
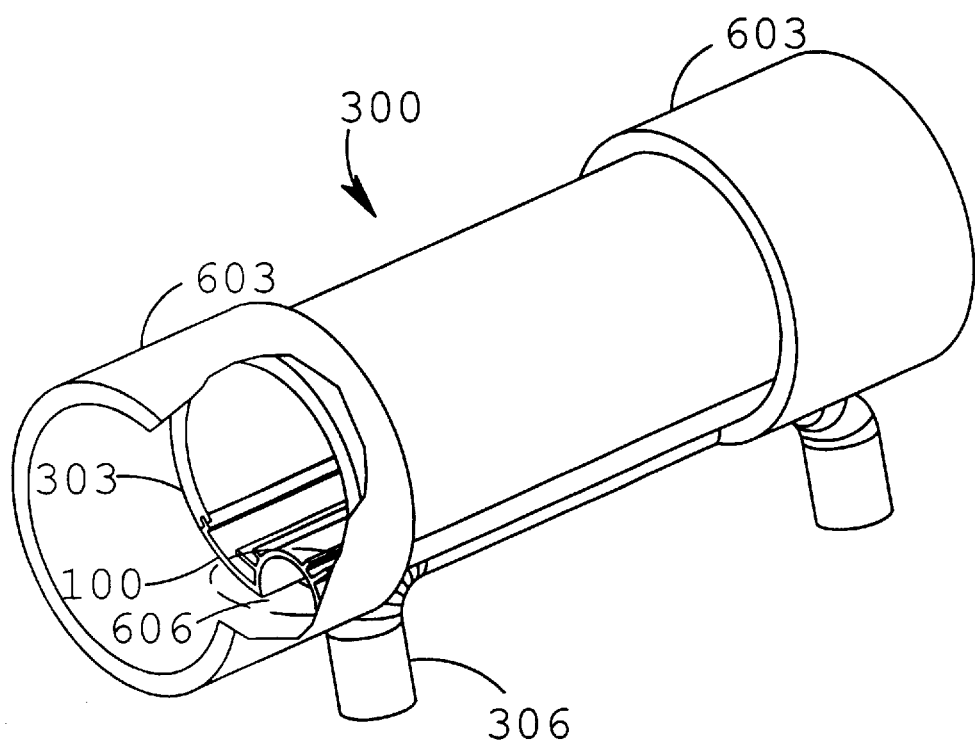
FIG. 6 generally depicts a heat exchanging tubing configuration, implementing the heat exchanging device of FIG. 1, engaged with a second structure in accordance with the invention.

A heat exchanging tubing configuration 300, implementing the heat exchanging device 100 of FIG. 1, engaged with a second structure in accordance with the invention is depicted in FIG. 6. As shown in FIG. 6, the first structure 303 is coupled to the heat exchanging device 100 to form the heat exchanging tubing configuration 300. The second structure 306 is shown engaged with the heat exchanging device 100 in the open area 106. Couplers 603 are connected to the end of the heat exchanging tubing configuration 300 so that the entire configuration may be further coupled to other lengths of PVC pipe (not shown).

An end of the heat exchanging device 100 which is open as shown in FIG. 6 is filled with a silicon-based compound 606 so that waste water does not leak from the heat exchanging tubing configuration 300 when coupled to other PVC pipes during use. An outline of the silicon-based compound 606 is depicted by the dotted lines shown in FIG. 6. Although FIG. 6 only depicts one end of the heat exchanging tubing configuration 300, all such ends have the silicon-based compound applied thereto. Additionally, other methods of sealing the heat exchanging tubing configuration 300 so that waste water does not leak during use are also contemplated. For example, a rubber stopper could be designed to plug the opening, and a silicon-based compound used to seal the rubber stopper. As one of ordinary skill in the will appreciate, many such methods to seal the opening exist.

Figure 4:
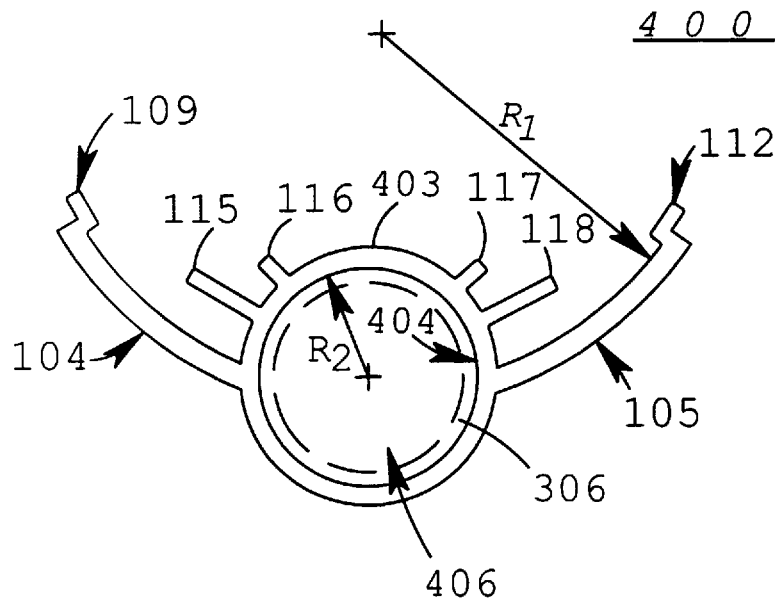
FIG. 4 generally depicts an alternate embodiment of the heat exchanging device of FIG. 1 in accordance with the invention.

While a particular embodiment of the present invention has been shown and described, it should be understood that various alternatives, substitutions and equivalents can be implemented. For example, an alternate embodiment of the heat exchanging device 100 of FIG. 1 is generally designated 400 in FIG. 4. As depicted in FIG. 4, the third semi-circular portion 107 depicted in FIG. 1 is replaced by a circular portion 403. In this embodiment, the second structure 306 (shown dotted in FIG. 4) would be inserted into the open area 406 from either end of the heat exchanging device 400. As such, the circular portion 403 would be in substantial thermal contact with the second structure 306 via the surface 404, and would thus engage the second structure 306 with the heat exchanging device 400. Again, thermal grease (not shown) may be disposed between the surface 404 of the heat exchanging device 400 and the second structure 306 to maximize the thermal transfer from the heat exchanging device 400 to the second structure 306.

As one of ordinary skill in the art will appreciate, the heat exchanging device 400 depicted in FIG. 4 may be implemented without the necessity of the second structure 306. For example, the circular portion 403 of the heat exchanging device 400 may itself contain an object to be warmed by heat exchange. In this embodiment, the radius $R_2$ would be the inner radius of tubing which is a typical (standard) size for implementation in residential, commercial and industrial structures.

Figure 5:
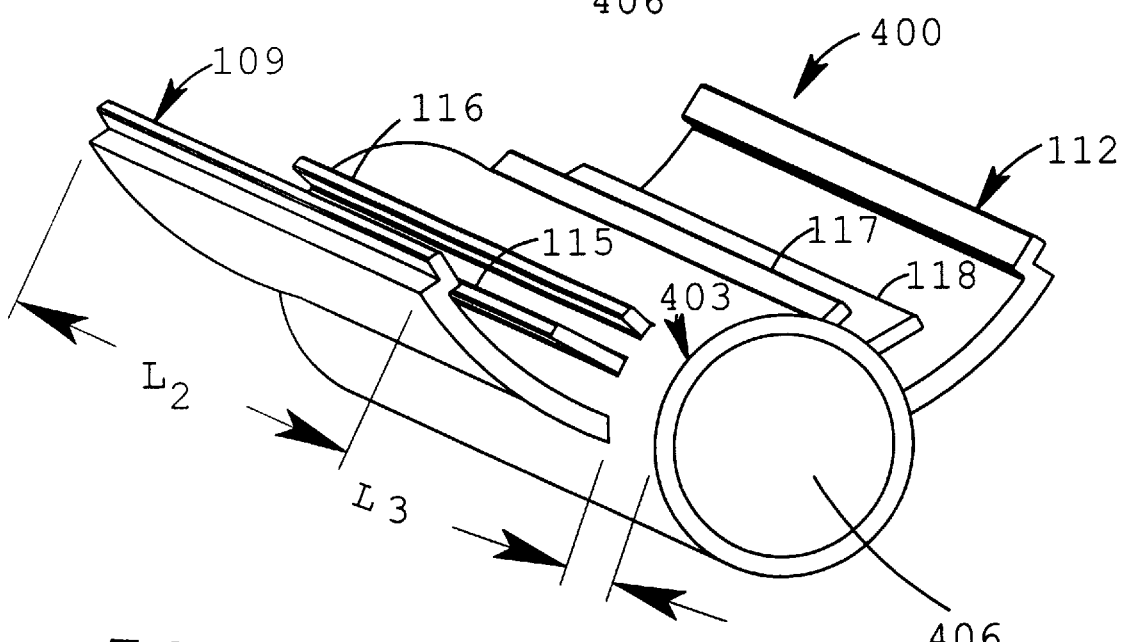
FIG. 5 generally depicts a front, top and side perspective of the heat exchanging device of FIG. 4.

As depicted in FIG. 5, the circular portion 403 extends beyond the predetermined length $L_2$ by a length $L_3$ in accordance with the invention. The length $L_3$ may be any length suitable for connection to other plumbing utilized within the residential, commercial or industrial structure. In this embodiment, the preferred method to connect the heat exchanging device 400 to other plumbing is by solder, but other methods exist as one of ordinary skill in the art will appreciate. The heat exchanging device 400 is comprised of Cu in this embodiment, but other compositions, such as aluminum, are contemplated.

Various features of the present invention as described in relation to the various embodiments are set forth in the following claims.

I claim:

1. A heat exchanging tubing configuration comprising:
   a first structure comprised of a poly vinyl chloride (PVC) tube having a portion cut therefrom; and
   an apparatus, the apparatus comprising:
   first and second circular portions each having a curvature defined by a first radius and each having respective first and second coupling portions for coupling the apparatus to the first structure along a predetermined length of the apparatus, the combination of the apparatus and the first structure forming a passage for a heat source to flow; and
   a third portion, integral with the first and second coupling portions and having a curvature defined by a second radius, for engaging the apparatus with a second structure, wherein the second structure contains an object to be warmed by heat exchange.

2. The heat exchanging tubing configuration of claim 1 further comprising a plurality of absorption fins integral with the third portion and extending outward from the third portion.

3. The apparatus of claim 2 wherein the plurality of absorption fins integral to the third circular portion absorb heat from the heat source and exchange the heat to the second structure.

4. The heat exchanging tubing configuration of claim 1 wherein the third portion further comprises a circular portion for coupling the apparatus to a second structure, wherein the second structure contains an object to be warmed by heat exchange.

5. The apparatus of claim 4 wherein the third circular portion further comprises a surface for engaging the third circular portion with a second structure, wherein the surface is in substantial thermal contact with the second structure.

* * * * *